US011384726B2

(12) United States Patent
Power, III et al.

(10) Patent No.: US 11,384,726 B2
(45) Date of Patent: Jul. 12, 2022

(54) HYDROELECTRIC ENERGY SYSTEMS AND METHODS

(71) Applicant: OCEANA ENERGY COMPANY, Washington, DC (US)

(72) Inventors: Daniel E. Power, III, Pace, FL (US); Kent Davey, Lebanon, OH (US)

(73) Assignee: OCEANA ENERGY COMPANY, Washington, DC (US)

( * ) Notice: Subject to any disclaimer, the term of this patent is extended or adjusted under 35 U.S.C. 154(b) by 0 days.

(21) Appl. No.: 17/056,490

(22) PCT Filed: May 29, 2019

(86) PCT No.: PCT/US2019/034306
§ 371 (c)(1),
(2) Date: Nov. 18, 2020

(87) PCT Pub. No.: WO2019/231992
PCT Pub. Date: Dec. 5, 2019

(65) Prior Publication Data
US 2021/0190032 A1    Jun. 24, 2021

Related U.S. Application Data

(60) Provisional application No. 62/677,978, filed on May 30, 2018.

(51) Int. Cl.
*F03B 13/26* (2006.01)
*F03B 3/16* (2006.01)
*F03B 17/06* (2006.01)

(52) U.S. Cl.
CPC .............. *F03B 13/264* (2013.01); *F03B 3/16* (2013.01); *F03B 17/061* (2013.01);
(Continued)

(58) Field of Classification Search
CPC ........ F03B 13/264; F03B 3/16; F03B 17/061; F05B 2240/30; F05B 2240/53
See application file for complete search history.

(56) References Cited

U.S. PATENT DOCUMENTS

| 4,445,046 A | 4/1984 | Allegre et al. |
| 4,720,640 A * | 1/1988 | Anderson ............... F03D 13/20 290/43 |

(Continued)

FOREIGN PATENT DOCUMENTS

| DE | 4313509 A1 | 2/1994 |
| JP | 2015-195717 A | 11/2015 |

(Continued)

OTHER PUBLICATIONS

International Search Report and Written Opinion issued in PCT/US2019/034306, dated Aug. 27, 2019.

(Continued)

*Primary Examiner* — Sean Gugger
(74) *Attorney, Agent, or Firm* — Jones Robb, PLLC

(57) ABSTRACT

In accordance with various embodiments of the present disclosure, a hydroelectric turbine includes a stator and a rotor disposed radially outward of the stator. The rotor is rotatable around the stator about an axis of rotation. The turbine also includes a generator disposed along the axis of rotation. The generator is stationary and coupled to the stator. The turbine additionally includes a gear disposed along the axis of rotation. The gear is operably coupled to the generator. The turbine further includes a plurality of blades operably coupled to and extending radially outwardly from the gear. The plurality of blades is fixed to the rotor to rotate the rotor in response to fluid flow interacting with the blades.

21 Claims, 5 Drawing Sheets

(52) U.S. Cl.
CPC ..... *F05B 2220/706* (2013.01); *F05B 2240/30* (2013.01); *F05B 2240/53* (2013.01); *F05B 2250/411* (2013.01); *F05B 2260/404* (2013.01)

(56) References Cited

U.S. PATENT DOCUMENTS

| | | |
|---|---|---|
| 7,453,166 B2 | 11/2008 | Power, III et al. |
| 7,604,454 B2 | 10/2009 | Power, III et al. |
| 9,359,991 B2 | 6/2016 | Davey et al. |
| 10,060,473 B2 | 8/2018 | Davey et al. |
| 10,389,209 B2 | 8/2019 | Power et al. |
| 10,544,775 B2 | 1/2020 | Power, III |
| 2010/0007148 A1 | 1/2010 | Davis et al. |
| 2010/0032952 A1 | 2/2010 | Hatch et al. |
| 2011/0012361 A1 | 1/2011 | Lee |
| 2012/0211990 A1* | 8/2012 | Davey ................ F16C 32/0417 290/54 |
| 2013/0134815 A1 | 5/2013 | Powell et al. |
| 2014/0353971 A1 | 12/2014 | Davey |
| 2017/0104388 A1 | 4/2017 | Toliyat et al. |
| 2017/0110956 A1* | 4/2017 | Morris ................ H02K 49/102 |
| 2019/0326794 A1 | 10/2019 | Power, III et al. |

FOREIGN PATENT DOCUMENTS

| | | |
|---|---|---|
| WO | 03/067749 A1 | 8/2003 |
| WO | 2017-070180 A1 | 4/2017 |
| WO | 2017-172747 A1 | 10/2017 |

OTHER PUBLICATIONS

International Search Report and Written Opinion issued in PCT/US2019/064873, dated Mar. 26, 2020.
European Search Report issued in corresponding European Patent Application No. 19812222.8, dated Mar. 23, 2022.

* cited by examiner

HYDROELECTRIC ENERGY SYSTEMS AND METHODS

CROSS-REFERENCE TO RELATED APPLICATION

This application is a National Stage application of International Patent Application No. PCT/US2019/034306, filed internationally on May 29, 2019, which claims priority to U.S. Provisional Patent Application No. 62/677,978, filed May 30, 2018 and entitled "Hydroelectric Energy Systems and Methods," the entire content each of which is incorporated by reference herein.

TECHNICAL FIELD

The present disclosure relates generally to hydroelectric energy systems and methods, and more particularly to hydroelectric turbines.

INTRODUCTION

The section headings used herein are for organizational purposes only and are not to be construed as limiting the subject matter described in any way.

A hydroelectric energy system may utilize a hydroelectric turbine to generate electricity from the current in a moving body of water (e.g., a river or ocean current) or other fluid source. Tidal power, for example, exploits the movement of water caused by tidal currents, or the rise and fall in sea levels due to tides. As the waters rise and then fall, a flow, or fluid current, is generated. The one-directional flow, for example, from a river also creates a current that may be used to generate electricity. Additional forms of differential pressure, such as, for example, that are created by dams, also can cause water to flow and create water speeds sufficient to enable the conversion of energy associated with the water's flow to other useful forms of energy.

Hydroelectric energy, which relies on the natural movement of currents in a body of liquid (e.g., water), is classified as a renewable energy source. Unlike other renewable energy sources, such as wind and solar energy, however, hydroelectric energy is reliably predictable. Water currents are a source of renewable power that is clean, reliable, and predictable years in advance, thereby facilitating integration with existing energy grids. Additionally, by virtue of the basic physical characteristics of water (including, e.g., seawater), namely, its density (which can be 832 times that of air) and its non-compressibility, this medium holds unique "ultra-high-energy-density" potential in comparison to other renewable energy sources for generating renewable energy. This potential is amplified once the volume and flow rates present in many coastal locations and/or useable locations worldwide are factored in.

Hydroelectric energy, therefore, may offer an efficient, long-term source of pollution-free electricity, hydrogen production, and/or other useful forms of energy that can help reduce the world's current reliance upon petroleum, natural gas, and coal. Reduced consumption of fossil fuel resources can in turn help to decrease the output of greenhouse gases into the world's atmosphere.

Electricity generation using hydroelectric turbines (which convert energy from fluid currents) is generally known. Examples of such turbines are described, for example, in U.S. Pat. No. 7,453,166 B2, entitled "System for Generating Electricity from Fluid Currents;" U.S. Pat. No. 9,359,991 B2, entitled "Energy Conversion Systems and Methods;" and U.S. Patent Application Publication No. 2017/0207680 A1, entitled "Hydroelectric Turbines, Anchoring Structures, and Related Methods of Assembly," each of which is incorporated by reference in its entirety herein. Such turbines can act like underwater windmills, and have a relatively low cost and ecological impact. In various hydroelectric turbines, for example, fluid flow interacts with blades that rotate about an axis and that rotation is harnessed to thereby produce electricity or other forms of energy.

Hydroelectric energy systems, however, are generally relatively complex and require custom components and parts that can be costly to produce in the large scale required for such systems. Additional challenges also may arise with assembling such large and complex systems at an installation location.

It may, therefore, be desirable to provide a hydroelectric energy system that not only has a robust configuration, but also is efficient to produce and assemble. It also may be desirable to provide a hydroelectric energy system having a design that allows the use of off-the-shelf hardware, thereby reducing the number of custom component parts of the hydroelectric energy system. It may be further desirable to provide a hydroelectric energy system having a design that enables the utilization of computer assisted fabrication techniques, thereby allowing the design to be flexible and readily scaled to accommodate different applications.

SUMMARY

The present disclosure solves one or more of the above-mentioned problems and/or achieves one or more of the above-mentioned desirable features. Other features and/or advantages may become apparent from the description which follows.

Additional objects and advantages will be set forth in part in the description which follows, and in part will be obvious from the description, or may be learned by practice of the present teachings. At least some of the objects and advantages of the present disclosure may be realized and attained by means of the elements and combinations particularly pointed out in the appended claims.

In accordance with various exemplary embodiments of the present disclosure, a hydroelectric turbine may include a stator and a rotor disposed radially outward of the stator. The rotor is rotatable around the stator about an axis of rotation. The turbine may also include a generator disposed along the axis of rotation. The generator is stationary and coupled to the stator. The turbine may additionally include a gear disposed along the axis of rotation. The gear is operably coupled to the generator. The turbine may further include a plurality of blades operably coupled to and extending radially outwardly from the gear. The plurality of blades is fixed to the rotor to rotate the rotor in response to fluid flow interacting with the blades.

In accordance with various additional exemplary embodiments of the present disclosure, a hydroelectric energy system may include a stator and a rotor disposed radially outward of the stator. The rotor is rotatable around the stator about an axis of rotation. The hydroelectric energy system may also include a power takeoff system disposed along the axis of rotation. The hydroelectric energy system may further include a plurality of blades operably coupled to and extending radially outwardly from the power takeoff system, the plurality of blades being fixed to the rotor to rotate the rotor in response to fluid flow interacting with the blades. Each blade includes a first blade portion that extends radially outwardly from the power takeoff system, between the power takeoff system and the rotor, and a second blade portion that extends radially outwardly from the rotor. The first blade portions are configured to support the power takeoff system and transfer a high torque, low speed power input to the power takeoff system.

It is to be understood that both the foregoing general description and the following detailed description are exemplary and explanatory only and are not restrictive of the present disclosure and claims, including equivalents. It should be understood that the present disclosure and claims, in their broadest sense, could be practiced without having one or more features of these exemplary aspects and embodiments.

BRIEF DESCRIPTION OF THE DRAWINGS

The accompanying drawings, which are incorporated in and constitute a part of this specification, illustrate some exemplary embodiments of the present disclosure and together with the description, serve to explain certain principles. In the drawings

The present disclosure contemplates hydroelectric energy systems that include a hydroelectric turbine comprising a stationary member (e.g., a stator) and a rotating member (e.g., a rotor) that is disposed radially outward of an outer circumferential surface of the stator (e.g., is concentrically disposed around the stator) and configured to rotate around the stator about an axis of rotation. Turbines in accordance with the present disclosure have a plurality of blade portions extending both radially inward and radially outward with respect to the rotor. In this manner, fluid flow having a directional component flow generally parallel to the axis of rotation of the rotor acts on the blade portions thereby causing the rotor to rotate about the axis of rotation.

In accordance with one or more exemplary embodiments of the present disclosure, energy in the fluid flow can be directly converted to electricity using an off the shelf generator that is positioned at a fixed point at the center of the turbine. The generator, for example, may be disposed along the axis of rotation of the turbine and supported relative to the stator to prevent the generator from rotating about the axis of rotation. In accordance with various embodiments, for example, the generator may be disposed within a fixed housing, or pod, that is supported by a support member that interfaces with the stator. In various exemplary embodiments, the support member may include a rim that is coupled to the stator and a plurality of cross angle struts (e.g., spokes) that extend between the rim and the generator housing.

To convert the high torque, low speed power collected by the blades to a low torque, high speed input suitable for the generator, various embodiments of the present disclosure further contemplate coupling the generator to a gear. In an exemplary embodiment, a magnetic gear is used that is also disposed along the axis of rotation between the generator and the radially inward extending blade portions. In accordance with various exemplary embodiments, the radially inward extending blade portions terminate at and are affixed to the magnetic gear, such that the radially inward extending blade portions support the magnetic gear at the center of the turbine.

Accordingly, embodiments of the present disclosure contemplate hydroelectric energy systems that utilize a new power takeoff system that replaces electricity-generating elements embedded in both the stator and rotor and thus rotate relative to one another. The power takeoff system contemplated herein can reduce complexity and cost, and can utilize off-the-shelf components.

Figure 1:
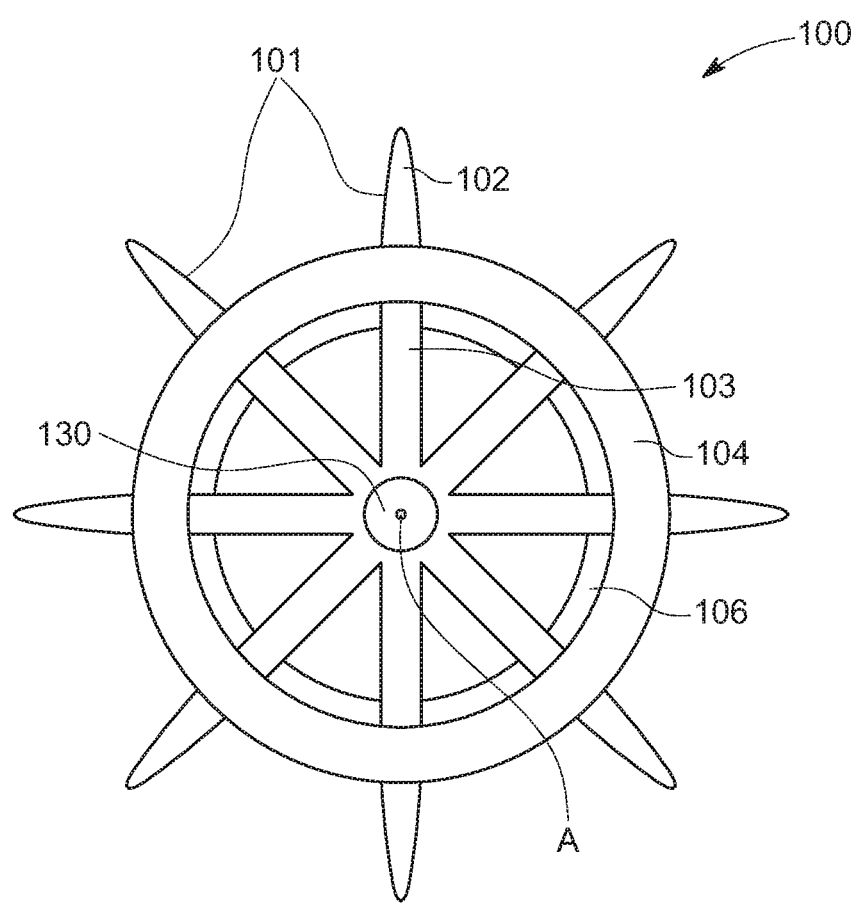
FIG. 1 is a front view of an exemplary embodiment of a hydroelectric turbine in accordance with the present disclosure.
Figure 2:
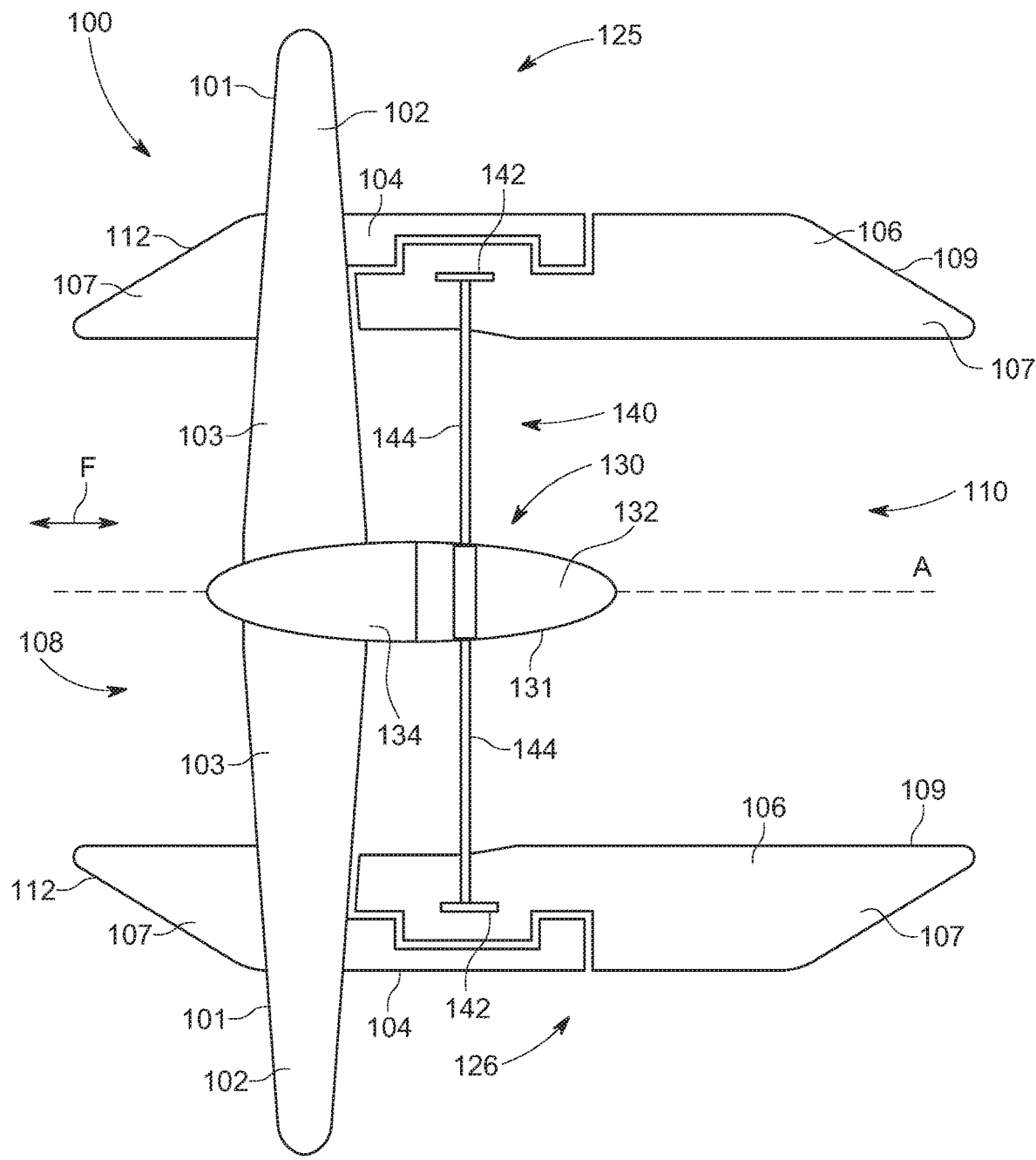
FIG. 2 is a cross-sectional view of the hydroelectric turbine of FIG. 1.

With reference now to FIGS. 1 and 2, an exemplary embodiment of a hydroelectric turbine 100 in accordance with the present disclosure is shown. The hydroelectric turbine 100 includes a rotor 104 disposed radially outward of a stator 106. In this arrangement, a plurality of blades (hydrofoils) 101 can extend radially from proximate a rotational axis A of the rotor 104. As shown in FIG. 1, each blade 101 may have a length that extends from proximate a center of the rotor 104 (e.g., from a power takeoff system 130 described further below) to radially beyond the rotor 104 such that a blade portion 103 extends radially inwardly of rotor 104 and a blade portion 102 extends radially outwardly of rotor 104. In this way, the blades 101 can be arranged to intercept the fluid flow F (schematically designated generally by the arrows in FIG. 2) flowing centrally through the rotor and radially outward of the rotor to thereby cause the rotor 104 to rotate relative to the stator 106 about the central axis of rotation A. In various exemplary embodiments the plurality of blades 101 can be mounted at uniform intervals about the axis of rotation A. However, non-uniform spacing between adjacent blades is also contemplated.

As described, for example, in U.S. Patent Application Publication No. 2017/0207680 A1, incorporated by reference above, mounting the rotor 104 outside of the stator 106 may, for example, permit the rotor 104, or at least the portions of the rotor 104 between mounting regions for the blades 101 to be configured as a semi-rigid belt that provides some flex over a large diameter. In this manner, the rotor 104 may ride on the outer surface of the stator 106 much like a belt or rope over a pulley (except, spaced a small distance from the stator as a result of the bearing systems as it rotates), thereby allowing the rotor 104 to bend/flex to some degree as it rotates. In various exemplary embodiments, for example, the rotor 104 may thus be made of a relatively durable material that provides some flexibility, such as, for example, Kevlar® or a carbon-fiber material, and the stator 106 may be made of a stronger, less flexible material, such as, for example, a metal or cast concrete. In various further exemplary embodiments, as described, for example, in U.S. Patent Application Publication No. 2017/0207680 A1, the rotor 104 may include a layered structure including a plurality of composite arc segments fastened together and a layer of carbon-fiber material disposed around an outer surface formed by the plurality of composite arcs.

The rotor 104 illustrated in the embodiment of FIGS. 1 and 2 may, therefore, take advantage of the inwardly disposed stator 106 to support the rotor 104 in a substantially closed loop configuration against the effects of gravity and other forces. In contrast, in a configuration wherein the rotor is disposed inward of the stator, an alternative arrangement (not shown) that is contemplated as within the scope of the present disclosure, the rotor may need to be more rigid in order to maintain the outer surface of the rotor adjacent the inner surface of the stator. Thus, the rotor 104 in the configuration illustrated in FIGS. 1 and 2 may benefit from reduced weight, less materials, and/or use of less expensive materials as a result of the reduced support requirements for the rotor.

As shown in FIG. 2, the hydroelectric turbine 100 may be shaped to accommodate a central power takeoff system 130. In various embodiments, for example, the turbine may further include hydrodynamic features that help to minimize non-productive drag and divert excess fluid flow outside of the turbine and away from the power takeoff system 130. For example, in the exemplary embodiment of FIG. 2 diversion arcs 107 are located at both a first end face 108 and a second opposite end face 110 of the turbine 100, specifically at end portions of the rotor and stator, respectively. The diversion arcs 107 may, for example, be placed between the blades 101 such that an arc 107 is located on either side of each blade 101. In this manner, the fluid flowing in either direction (i.e., represented by the fluid flow F) toward the turbine 100 will be diverted to either side 125, 126 of the turbine 100. In various embodiments, for example, an end portion 112 of the rotor 104 may be shaped with a diversion arc 107 to divert fluid flowing in the direction toward the end face 108 to either side 125, 126 of the turbine 100. In the same manner, an end portion 109 of the stator 106 may be shaped with a diversion arc 107 to divert fluid flowing in the direction toward the end face 110 to either side 125, 126 of the turbine 100.

As illustrated in FIG. 2, the blades 101 can be attached toward a front rim of the rotor 104 proximate the first end face 108 of the turbine 100 and can extend radially outward from the centrally located power takeoff system 130. As described above, a length of the blades 101 can be such the blades 101 extend from the power takeoff system 130 to radially beyond the outer circumference of the rotor 104. The arrangement of the rotor 104 radially outward of the stator 106 may facilitate the arrangement of the blade portions 102, 103 respectively extending radially outwardly and inwardly of the rotor, while also placing the blades 101 in a position to sweep a maximum arc of current. Thus, the blades 101 can collect flow energy from the fluid flow F in sweeps away from the central axis of rotation A and in sweeps toward the central axis of rotation A, respectively. This may help to balance the forces acting on the rotor, thereby reducing stress on the rotor 104 and allowing for the use of less material in both the rotor 104 and the blades 101.

In various exemplary embodiments, the blades 101 may be molded as a monolithic structure from a composite material, such as, for example, a carbon-fiber-reinforced plastic. However, the present disclosure also contemplates molding the blades in separate pieces and joining the pieces together, for example, integrally joining blade portions 102 and 103.

Further, although not shown, in accordance with various exemplary embodiments, as described in International Patent Application Publication No. WO 2017/070180, entitled "Hydroelectric Energy Systems, and Related Components and Methods," which is incorporated by reference in its entirety herein, to increase the strength of the blades, the blades may have an extended radial shape and extend in an axial direction to rest on the rotor.

In accordance with various additional embodiments, to further balance the forces on the blades 101, the length of the blade portion 103 (i.e., the portion of the blade 101 from the power takeoff system 130 to the rotor 104) is longer than the length of the blade portion 102 (i.e., the portion of the blade 101 that extends radially outwardly from the rotor 104). Because the blade portion 102 (i.e., the portion of the blade 101 that extends radially outwardly of the rotor 104) has a greater sweep, the length of the blade portion 103 (radially inwardly of the rotor 104) can be longer to help balance the forces from the fluid flow on the blade 101. In various embodiments, for example, the blade portion 103 is about 33% longer than the blade portion 102.

Figure 5:
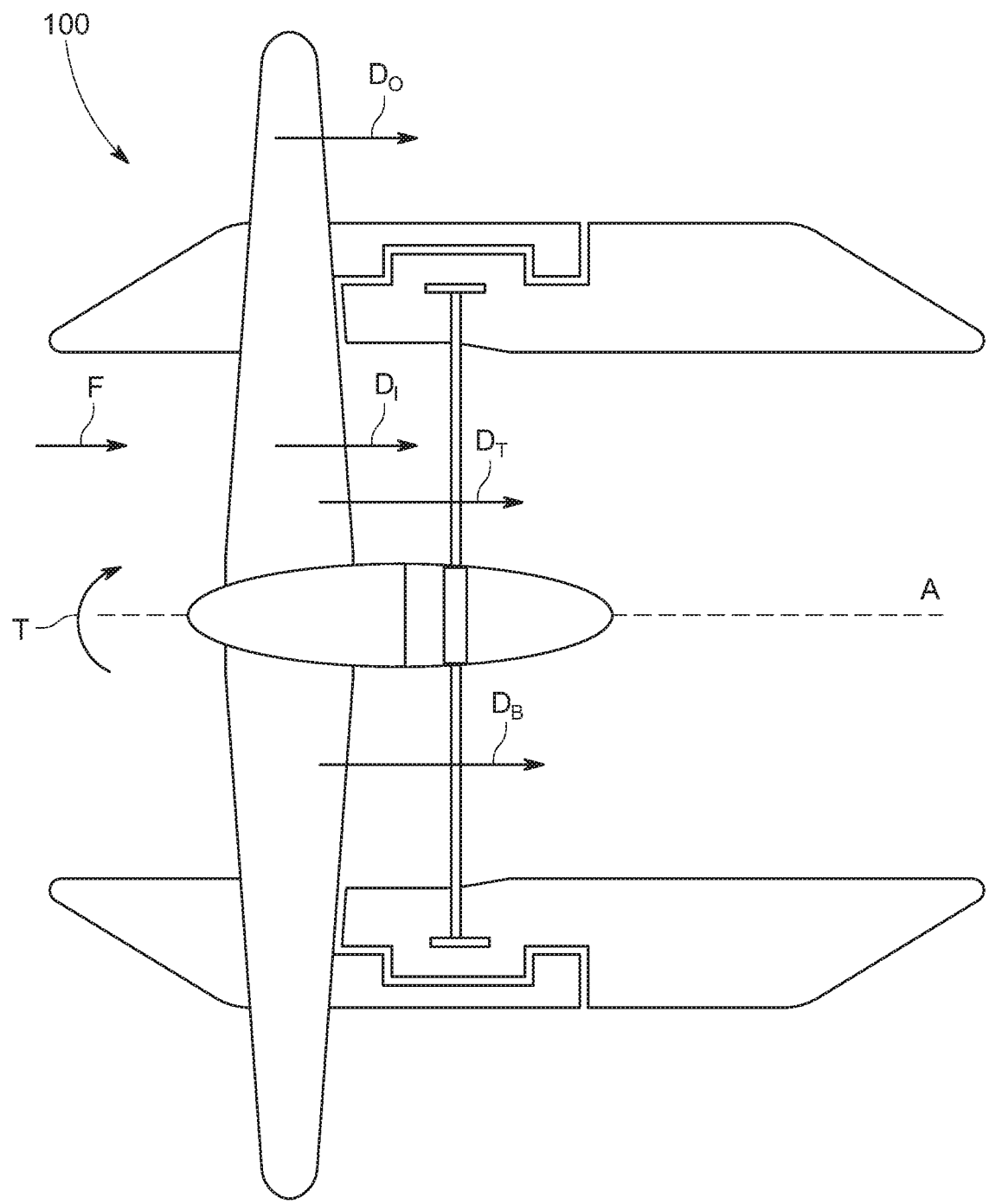
FIG. 5 is a cross-sectional view of the hydroelectric turbine of FIG. 1 illustrating the forces acting on the hydroelectric turbine of FIG. 1.

As illustrated in FIG. 5, for example, as the fluid flow F interacts with the blades 101 there is both a torque T and an axial drag force D (i.e., including an outboard axial drag force $D_O$ and an inboard axial drag force $D_I$) acting on the blades 101. In the contemplated configuration of the blades 101, however, the rotor 104 (which supports the blades 101) is positioned to balance the outboard axial drag force $D_O$ with the inboard axial drag force $D_I$. In other words, since the length of the blade portion 103 (i.e., extending radially inwardly from the rotor 104) can be longer than the length of the blade portion 102 (i.e., extending radially outwardly from the rotor 104), the outboard axial drag force $D_O$ is balanced with the inboard axial drag force $D_I$.

Because of this balance, the out of plane torque T on the rotational axis A of the rotor 104 is minimized in a uniform fluid flow F. The fluid flow F in applications designed to extract power from rivers and oceans is, however, often not uniform. Indeed, for example, in ocean applications, there is a boundary condition on the fluid flow F that demands that the fluid flow on the ocean floor itself be zero. Thus, an axial drag force $D_B$ on a bottom of the turbine 100 is generally smaller than an axial drag force $D_T$ on a top of the turbine 100. This results in a clockwise torque T on the turbine 100 as shown by the arrow in FIG. 5. In this type of non-uniform flow, the imbalance produced by the fluid flow F (i.e., between $D_B$ and $D_T$) only occurs in the vertical direction (i.e., when the blades 101 of the turbine 100 are at a 12 o'clock and a 6 o'clock position). Thus, as the blades 101 rotate through other positions (e.g., when the blades 101 are at a 9 o'clock and a 3 o'clock position) the axial drag forces $D_O$ and $D_I$ and the torque T should be balanced. In this manner, the proposed configuration of the blades 101, serves to suppress the out of plane torque T for a portion of each rotation cycle of the rotor 104 even in non-uniform fluid flow.

Thus, with the proposed configuration of the blades 101, the more uniform the fluid flow F, the lower the torque T on the blades 101 (i.e., as more torque is suppressed), which results in a smaller amount of material (e.g., relatively expensive composite material) required to build the rotor 104. This will facilitate installation of the turbine 100. In other words, since there is less torque T on the rotational axis A of the rotor 104 (i.e., from the blades 101), the rotor 104 requires less material to contain the torque T. As will be further understood by those of ordinary skill in the art, due to an added reduction in vibration, any suppression of the torque T also helps to reduce metal fatigue on the bearings and the structure of the turbine 100.

In the same manner, the contemplated turbine 100 may also utilize new stator configurations (e.g., a stator 106 having a less robust design) and manufacturing techniques. In accordance with various embodiments, for example, the stator 106 can be 3-D printed, using, for example, a metal material. Utilizing such 3-D printing techniques, a stator design can be saved in a design file and later printed on site during assembly of the turbine 100. Furthermore, the stator 106 can be readily scaled (via the stored design file) to accommodate various sizes of turbines 100.

As described in International Patent Application Publication No. WO 2017/070180, incorporated by reference above, to support the rotor 104 (both axially and radially)

with respect to the stator 106, hydroelectric turbines in accordance with the present disclosure may employ various configurations of magnetic and/or hydrodynamic bearings. In accordance with various embodiments, for example, one or more sets of hydrodynamic bearings can be disposed for radially aligning the rotor 104 relative to the stator 106. And, in a similar manner, in various additional exemplary embodiments, one or more sets of hydrodynamic bearings can be disposed for maintaining relative axial positioning of the rotor 104 relative to the stator 106. Various embodiments, for example, contemplate using water lubricated bearings made of wood, such as, for example, as commercially available from Lignum-Vitae North America of Powhatan Va., or a composite material, such as, for example, Vesconite, which would rub on a carbon fiber or stainless-steel surface, as the radial and axial hydrodynamic bearings between the rotor 104 and the stator 106.

As would be understood by those of ordinary skill in the art, the referenced sets of hydrodynamic bearings may have various arrangements and configurations, and/or may be replaced or used in conjunction with any known bearing mechanism and/or system, including, for example, magnetic bearing systems. Other types, configurations, and arrangements of bearings that may support the rotor 104 with respect to the stator 106 are also possible, for example, as described in U.S. Patent Application Publication No. 2017/0207680 A1, incorporated by reference above.

With reference now to FIG. 2, in various exemplary embodiments, the hydroelectric turbine 100 includes a centrally located power takeoff system, such as, for example, a mechanical power takeoff system 130, that is disposed along the axis of rotation A of the turbine 100. The mechanical power takeoff system 130 includes a generator 132 and a gear 134 that is coupled to the generator 132. An electrical power takeoff, such as, for example, a set of wires, (not shown) is coupled to the generator 132. As shown in FIG. 2, the gear 132 is disposed along the axis of rotation A between the generator 132 and the blades 101. In various embodiments, for example, as above, the blades 101 terminate at and are affixed to the gear 134. In this manner, the blades 101 support the gear 134 (i.e., along the central axis of rotation A) and may transfer a high torque, low speed power input to the gear 134. In turn, the gear 134 is configured to provide a low torque, high speed power output to the generator 132.

As above, in the contemplated balanced configuration of the blades 101, only a rotational force (i.e., torque T) is acting on the blades 101 (i.e., the axial drag forces $D_O$, $D_I$ from the fluid flow F are contained in the rotor 104). The mechanical power takeoff system 130 is coupled to the stationary stator 106 via, for example, support members 140 coupled to the housing 131 of the generator 132. Thus, one side of the mechanical power takeoff system 130 is held stationary by the support members 140. The high speed side of the generator 132, which is also the high speed side of the gear 134, therefore, only encounters a small amount of the torque T. In other words, the support members 140 are configured to keep the housing 131 of the generator 132 and the low torque side of the gear 134 from rotating.

Figure 4:
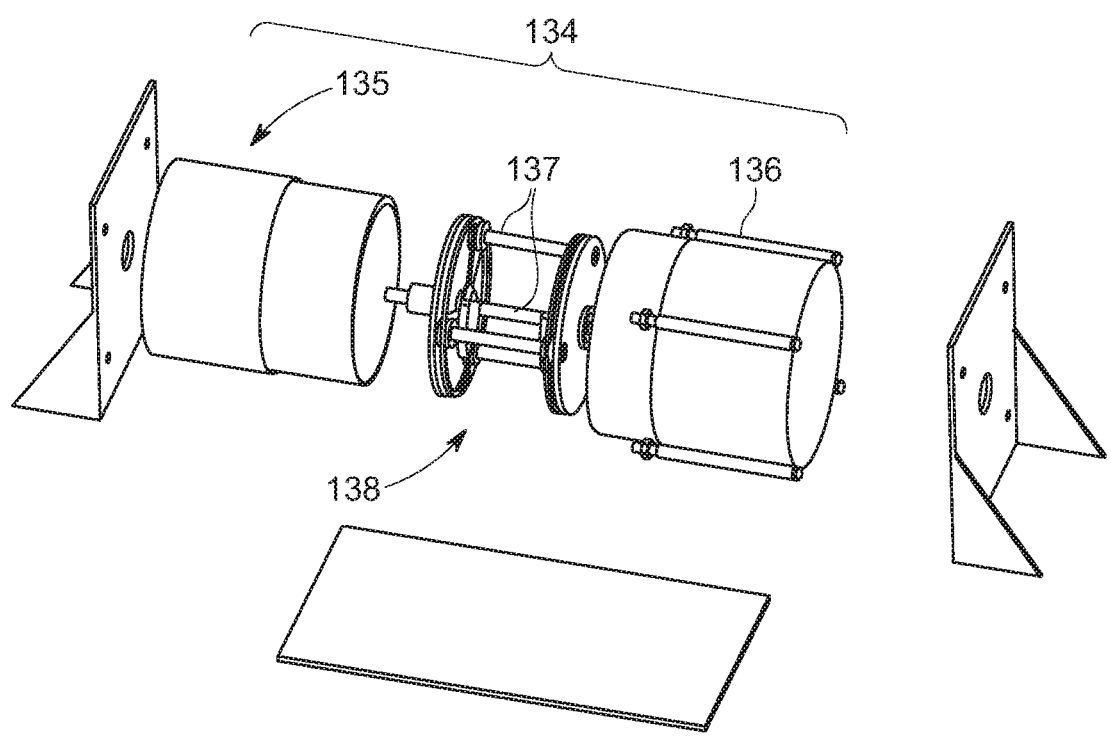
FIG. 4 is an exploded view of an exemplary magnetic gear of the hydroelectric turbine of FIG. 1.

Various embodiments of the present disclosure contemplate, for example, utilizing a magnetic gear, such as, for example, a magnetic cycloidal gear 134 as described below, that has a gear ratio greater than or equal to about 70:1 and a low speed torque greater than or equal to about 55,000 ft-lbs, in the power takeoff system 130. As illustrated in FIG. 4, in various exemplary embodiments, the gear 134 may include a cycloidal magnetic gear 134 that includes two magnetized drums 135, 136 with radially directed magnetic fields. As would be understood by those of ordinary skill in the art, an inner magnetized drum 135 is positioned eccentrically to the center of an outer magnetized drum 136. For example, a wobbler 138, which includes drive shafts 137 with identical cams attached respectively thereto, may be used to force the inner magnetized drum 135 into an eccentric motion relative to the outer magnetized drum 136.

The cycloidal magnetic gear illustrated in FIG. 4 and described above is, however, exemplary only and those of ordinary skill in the art would understand that other types and variations of gears, including other types of magnetic (e.g., cycloidal magnetic gears) and mechanical gears, may be employed without departing from the scope of the present disclosure and claims. Those of ordinary skill in the art would understand, for example, that a common mechanical planetary gear can also be utilized as long as the required gear ratio and torque output is achieved.

As further illustrated in FIG. 2, the generator 132 is also disposed along the central axis of rotation A and is coupled to the gear 134, such that the gear 134 may provide the low torque, high speed power output to the generator 132. As discussed above, the generator 122 is supported relative to the stator 106 to prevent the generator 132 from also rotating about the axis of rotation A. In various embodiments, for example, the generator 132 is disposed within a fixed housing, or pod having a hydrodynamic profile, 131. To support the centrally positioned generator 132, in accordance with various embodiments of the present disclosure, the hydroelectric turbine 100 may further include a support member 140 including a rim 142 coupled to the stator 106 and a plurality of struts 144 extending between the rim 132 and the housing 131 of the generator 132. In various embodiments, for example, as shown in FIG. 2, the rim 142 may be embedded within the stator 106, while in various additional embodiments the rim 142 may be affixed to an inner circumferential surface of the stator 106. In this manner, like the spokes of a bicycle wheel, the struts 144 may extend at cross angles between the stator 106 and the generator 132 to support the generator 132. In various embodiments, for example, the struts may comprise two or more stainless steel spokes that are mounted at uniform intervals about the axis of rotation A. However, non-uniform spacing between adjacent spokes is also contemplated.

Figure 3:
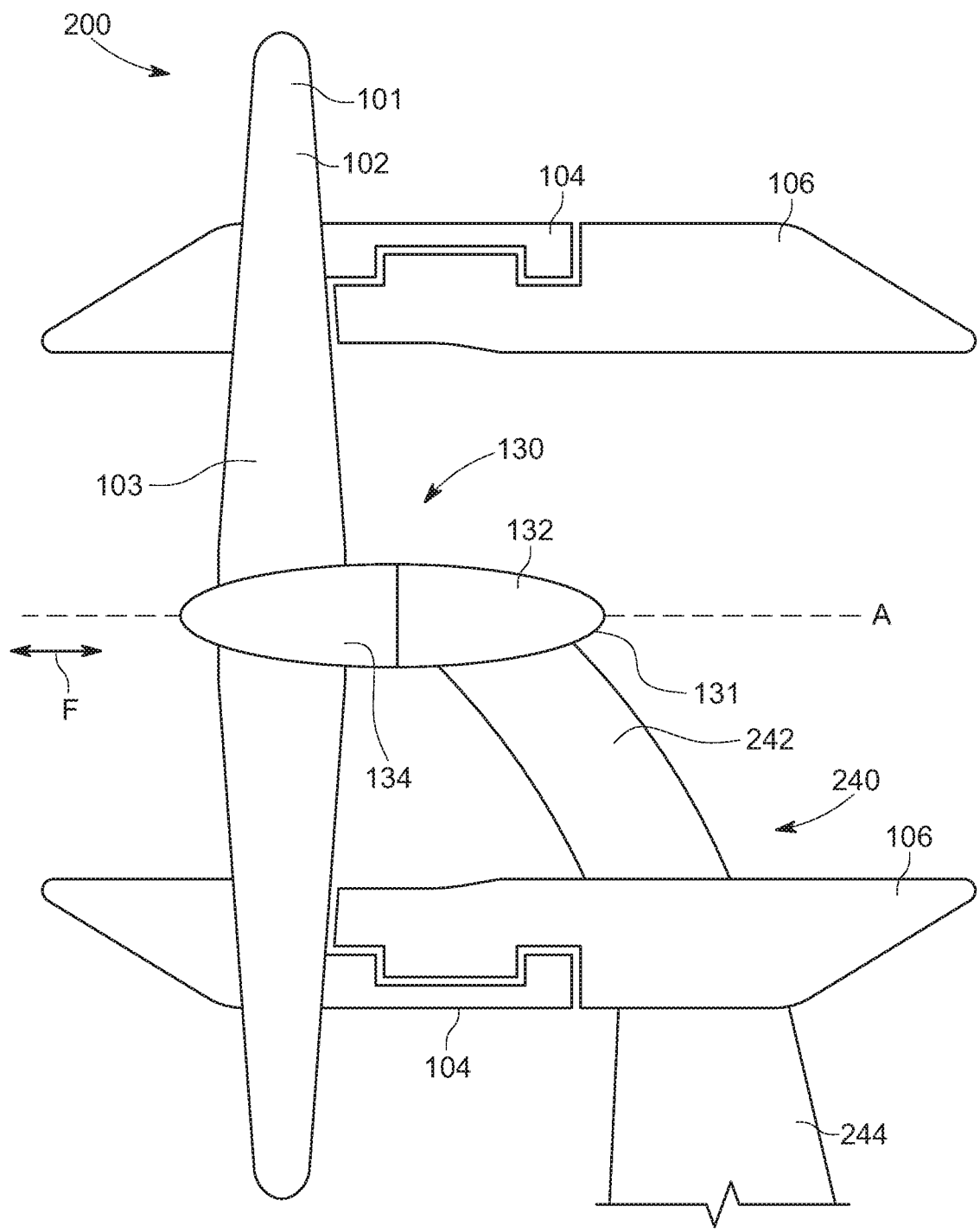
FIG. 3 is a cross-sectional view of another exemplary embodiment of a hydroelectric turbine in accordance with the present disclosure.

The support member 140 illustrated in FIG. 2 and described above is, however, exemplary only and those of ordinary skill in the art would understand that various types and configurations of support members, having various numbers and configurations of struts made of various types of materials, may be employed to support the generator 132 within the center of the turbine 100. As illustrated in FIG. 3 for example, various additional embodiments of the present disclosure contemplate a hydroelectric turbine 200 that uses a support member 240 that includes a support pillar. The pillar may, for example, comprise a concrete arm 242 that extends through the stator 206 and into an anchor 244.

Accordingly, the centrally positioned power takeoff system 130 contemplated by the present disclosure may replace turbine electricity-generating elements that are, for example, embedded within both the stator and the rotor and which must rotate relative to each other to produce electricity. Various embodiments contemplate that the generator 132 is an off-the-shelf, three-phase, high speed, low torque generator, thereby significantly reducing the cost and complexity of the hydroelectric turbine 100 and hydroelectric energy system utilizing the same. The resulting electricity produced by the generator 132 can then be transmitted via electrical transmission conduits (e.g., cables) for subsequent use or storage, for example, via one or more transmission lines or conductors connected to a land-based electrical energy grid.

Those of ordinary skill in the art would understand that the hydroelectric turbine embodiments of FIGS. 1-3, as described above, are exemplary only, and that the blades 101, rotors 104, and stators 106 may have various configurations, dimensions, shapes, and/or arrangements without departing from the scope of the present disclosure and claims. It would also be understood by those of ordinary skill in the art that a complete hydroelectric energy system, which utilizes the exemplary hydroelectric turbines 100, 200, can have various additional component parts, such as, for example, transmission lines and power takeoff components, that are connected, for example, to energy grids, which are not shown and described in the present disclosure. Furthermore, it would be understood by those of ordinary skill in the art that the turbines of the present disclosure may be configured to operate with various and changing directions of fluid flow (as illustrated by the multi-directional arrows illustrating the fluid flow F in the figures), and are configured to operate with both the ebb and flow of, for example, tidal currents, as well as currents coming from only one direction, such as, for example, river currents. For example, the shape of the blades 101 may be different for systems used in different environments (e.g., oceans vs. rivers), to optimize the potential energy collection from the two-directional and one-directional flows.

Thus, as would be understood by those of ordinary skill in the art, although the present disclosure is generally described with reference to generating energy via tidal currents, the turbines, energy systems and features disclosed herein are applicable to a wide range of fluid flow applications including, but not limited to, ocean and tidal environments, rivers, and streams, as well as fluids other than water.

This description and the accompanying drawings that illustrate exemplary embodiments should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be included in the second embodiment.

It is noted that, as used herein, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, this description's terminology is not intended to limit the disclosure. For example, spatially relative terms—such as "upstream," downstream," "beneath," "below," "lower," "above," "upper," "forward," "front," "behind," and the like—may be used to describe one element's or feature's relationship to another element or feature as illustrated in the orientation of the figures. These spatially relative terms are intended to encompass different positions and orientations of a device in use or operation in addition to the position and orientation shown in the figures. For example, if a device in the figures is inverted, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly.

Further modifications and alternative embodiments will be apparent to those of ordinary skill in the art in view of the disclosure herein. For example, the devices may include additional components that were omitted from the diagrams and description for clarity of operation. Accordingly, this description is to be construed as illustrative only and is for the purpose of teaching those skilled in the art the general manner of carrying out the present disclosure. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present disclosure.

It is to be understood that the particular examples and embodiments set forth herein are non-limiting, and modifications to structure, dimensions, materials, and methodologies may be made without departing from the scope of the present disclosure. Other embodiments in accordance with the present disclosure will be apparent to those skilled in the art from consideration of the specification and practice of the invention disclosed herein. It is intended that the specification and examples be considered as exemplary only, with being entitled to their full breadth of scope, including equivalents.

What is claimed is:

1. A hydroelectric turbine comprising:
   a stator;
   a rotor disposed radially outward of the stator, the rotor being rotatable around the stator about an axis of rotation;
   a generator disposed along the axis of rotation, the generator being stationary and coupled to the stator; and
   a gear disposed along the axis of rotation, the gear being operably coupled to the generator; and
   a plurality of blades operably coupled to and extending radially outwardly from the gear, wherein each blade terminates at a location radially outwardly of the rotor, the plurality of blades being fixed to the rotor to rotate the rotor in response to fluid flow interacting with the blades.

2. The hydroelectric turbine of claim 1, further comprising a plurality of struts extending from the generator and fixed to the stator, the plurality of struts supporting the generator.

3. The hydroelectric turbine of claim 1, wherein the generator is a three-phase, high speed, low torque generator.

4. The hydroelectric turbine of claim 1, wherein the gear is a magnetic gear.

5. The hydroelectric turbine of claim 4, wherein the gear has a gear ratio greater than or equal to about 70:1 and a low speed torque greater than or equal to about 55,000 ft-lbs.

6. The hydroelectric turbine of claim 4, wherein the magnetic gear is a cycloidal magnetic gear.

7. The hydroelectric turbine of claim 1, wherein each blade includes a first blade portion that extends radially inwardly of the rotor, between the rotor and the gear, and a second blade portion that extends radially outwardly of the rotor.

8. The hydroelectric turbine of claim 7, wherein a length of the first blade portion is longer than a length of the second blade portion.

9. The hydroelectric turbine of claim 1, wherein the plurality of blades is configured to balance moment forces acting on the rotor during rotation of the rotor.

10. The hydroelectric turbine of claim 1, wherein the stator is 3-D printed.

11. The hydroelectric turbine of claim 1, wherein the stator is a metal material.

12. The hydroelectric turbine of claim 1, wherein the rotor comprises a plurality of composite arcs segments fastened together.

13. A hydroelectric energy system comprising:
a stator;
a rotor disposed radially outward of the stator, the rotor being rotatable around the stator about an axis of rotation;
a power takeoff system disposed along the axis of rotation; and
a plurality of blades operably coupled to and extending radially outwardly from the power takeoff system, the plurality of blades being fixed to the rotor to rotate the rotor in response to fluid flow interacting with the blades,
wherein each blade includes a first blade portion that extends radially outwardly from the power takeoff system, between the power takeoff system and the rotor, and a second blade portion that extends radially outwardly from the rotor, and
wherein the first blade portions are configured to support the power takeoff system and transfer a high torque, low speed power input to the power takeoff system.

14. The hydroelectric energy system of claim 13, wherein the power takeoff system includes a mechanical power takeoff system comprising a generator and a gear that is operably coupled to the generator,
wherein the plurality of blades is operably coupled to the gear and the gear is disposed along the axis of rotation between the generator and the plurality of blades.

15. The hydroelectric energy system of claim 14, wherein the gear is a magnetic gear configured to provide a low torque, high speed power output to the generator.

16. The hydroelectric energy system of claim 15, wherein the generator is a three-phase, high speed, low torque generator.

17. The hydroelectric energy system of claim 15, wherein the magnetic gear has a gear ratio greater than or equal to about 70:1 and a low speed torque greater than or equal to about 55,000 ft-lbs.

18. The hydroelectric energy system of claim 15, wherein the magnetic gear is a cycloidal magnetic gear.

19. The hydroelectric energy system of claim 13, wherein the plurality of blades forms a single, solid blade structure.

20. The hydroelectric energy system of claim 13, wherein a length of each respective first blade portion is longer than a length of each respective second blade portion.

21. The hydroelectric energy system of claim 20, wherein the length of each respective first blade portion is about 33% longer than the length of each respective second blade portion.

* * * * *